(12) United States Patent
Xia et al.

(10) Patent No.: US 9,948,077 B2
(45) Date of Patent: Apr. 17, 2018

(54) MANUFACTURING PROCESS OF MOLDING STRESS CONTROL MODULE FOR CROSS-LINKED POLYETHYLENE INSULATION CABLE BODY TERMINAL

(71) Applicant: Cyg Electric Co., Ltd., Zhuhai, Guangdong (CN)

(72) Inventors: Yunjie Xia, Zhuhai (CN); Haijie Zhong, Zhuhai (CN); Zhenjie Liang, Zhuhai (CN); Xia Liu, Zhuhai (CN)

(73) Assignee: CYG ELECTRIC CO., LTD., Zhuhai, Guangdon (CN)

( * ) Notice: Subject to any disclaimer, the term of this patent is extended or adjusted under 35 U.S.C. 154(b) by 321 days.

(21) Appl. No.: 14/760,159

(22) PCT Filed: Jan. 22, 2014

(86) PCT No.: PCT/CN2014/071123
§ 371 (c)(1),
(2) Date: Jul. 9, 2015

(87) PCT Pub. No.: WO2015/032182
PCT Pub. Date: Mar. 12, 2015

(65) Prior Publication Data
US 2015/0340851 A1 Nov. 26, 2015

(30) Foreign Application Priority Data
Sep. 5, 2013 (CN) .......................... 2013 1 0399489

(51) Int. Cl.
| B29C 45/14 | (2006.01) |
| H02G 1/14 | (2006.01) |
| H02G 15/068 | (2006.01) |

(52) U.S. Cl.
CPC .............. *H02G 1/14* (2013.01); *H02G 15/068* (2013.01); *H02G 1/145* (2013.01)

(58) Field of Classification Search
CPC ........ H02G 1/145; H02G 1/14; H02G 15/145; B29C 45/14065
See application file for complete search history.

(56) References Cited

U.S. PATENT DOCUMENTS

| 4,365,947 A | 12/1982 | Bahder et al. |
| 4,495,130 A * | 1/1985 | Hedrick ................. H01R 43/24 264/254 |

(Continued)

FOREIGN PATENT DOCUMENTS

| CN | 103490351 A | 1/2014 |
| CN | 203466549 U | 3/2014 |
| JP | 59148509 A | 8/1984 |

OTHER PUBLICATIONS

International Search Report for PCT/CN2014/071123 dated May 28, 2014.

*Primary Examiner* — Christina A Johnson
*Assistant Examiner* — Kelsey C Grace
(74) *Attorney, Agent, or Firm* — Michael J. Feigin, Esq.; Feigin and Fridman

(57) ABSTRACT

The present invention discloses a manufacturing process for a termination injection molding stress control module for cross-linked polyethylene insulated cable body, which comprises the steps of melting and cross-linking a cable factory insulation layer and a filling insulation; melting and cross-linking the cable factory semiconducting layer and a filling semiconducting layer; and melting and cross-linking the filling insulation and the filling semiconducting layer.

4 Claims, 2 Drawing Sheets

(56) References Cited

U.S. PATENT DOCUMENTS

| | | |
|---|---|---|
| 4,681,985 A | 7/1987 | Katz et al. |
| 8,178,782 B2* | 5/2012 | Kamel ................. H02G 15/046 |
| | | 174/74 R |
| 2013/0126210 A1* | 5/2013 | Kehl ...................... H02G 15/06 |
| | | 174/118 |

* cited by examiner

MANUFACTURING PROCESS OF MOLDING STRESS CONTROL MODULE FOR CROSS-LINKED POLYETHYLENE INSULATION CABLE BODY TERMINAL

FIELD

The present invention relates to a process for a termination injection molding stress control module for cross-linked polyethylene insulated cable body, which is applicable to an on-site manufacturing process for a termination injection molding stress control module for 66 kv to 500 kV AC high voltage and ultra-high voltage, ±10 kV to ±500 kV DC cross-linked polyethylene insulated cable body.

BACKGROUND

Distortion of an electric field at a termination of a conventional 66 kV to 500 kV AC high voltage and ultra-high voltage, ±10 kV to ±500 kV DC cross-linked polyethylene insulated power cable may occur. In order to overcome the effects associated with distortion of the electric field, an outer semiconducting layer of the cable needs stress control design at the cutting position. Up to now, considerable achievements have been made in the technical field of cable termination stress control worldwide, and accessories designed accordingly have been put into market. Stress control within these accessories is accomplished in advance within the factory by professional manufacturers, that is, the accessories are pre-manufactured, and then assembled and fitted onto the cable body at site. An active interface exists between a stress cone and the cable body insulation. There are complications such as micro air gaps, micro water, impurities as well as insulation grease and the like in the active interface which easily result in creeping discharge of the air gaps and space charge accumulation and therefore local distortion of the electric field, thereby finally leading to insulation breakdown and imposing constraints on the safe operation of the cable system.

SUMMARY

In view of the above problems, the present invention provides a manufacturing process for a termination injection molding stress control module for cross-linked polyethylene insulated cable body, which is simple in construction, low in cost, and safe and reliable.

The technical scheme that the present invention adopts to solve its technical problems is described as follows.

A manufacturing process for termination injection molding stress control module for cross-linked polyethylene insulated cable body comprises the following steps: a. according to the requirements of the manufacturing process, stripping and cutting an outer protection layer and a metal protection layer at the cable termination, stripping the outer semiconducting layer (i.e., the factory outer semiconducting layer) of the cable, and grinding and smoothing the cable insulation (i.e., the factory insulation surface); mounting a molding machine at a port of the factory outer semiconducting layer of the cable, fixing the cable in the center of molding cavity of the insulation molding machine, and connecting a small extruder and a control instrument; when the insulation molding machine is started up and preheated to a temperature at which the cross-linked polyethylene melts, extruding the molten cross-linked polyethylene insulation (i.e., the filling insulation) having the same material as the cable insulation into a cavity of the molding machine, and raising the temperature and performing crosslinking through heating to allow the factory insulation and the filling insulation to melt, graft and combine into an integrated insulation after the molding cavity of the molding machine is filled with the filling insulation; and removing the insulation molding machine after it is cooled to obtain a particularly molded body of the cable termination stress control module insulation; and b. mounting a filling semiconducting layer molding machine at the port of the factory outer semiconducting layer of the cable; mounting and fixing the particularly molded body of the stress control module insulation in the center of molding cavity of the filling semiconducting layer molding machine, connecting the small extruder and the control instrument, and preheating the extruder; when the molding machine is started up and preheated to a temperature at which a cross-linked semiconducting material melts, starting the extruder to extrude the molten semiconducting material having the same material as the outer semiconducting layer of the cable into a cavity of the filling semiconducting layer molding machine to form a filling semiconducting layer, stopping the extruder after the cavity of the semiconducting layer molding machine is filled with the molten filling semiconducting material, and then raising the temperature and performing crosslinking through heating to allow the factory outer semiconducting layer, the factory insulation, the filling insulation and the filling semiconducting layer to melt, graft and combine with each other; and removing the insulation molding machine after it is cooled to obtain a particularly molded body of conduction and insulation of a cable termination stress control module.

Wherein in step a, the cable body is first put into the insulation molding machine for fixation and sealing before the molten cross-linked polyethylene cable insulation material is filled, and the molding machine is heated to 120° C. and maintained at this temperature; then the extruder is started to extrude the molten cross-linked polyethylene insulation in the extruder into the molding machine after the extruder is heated to a temperature between 105° C. and 120° C., the extruding is stopped when the pressure within the molding machine reaches 2 MPa to 5 MPa, and at this time the cross-linked polyethylene insulation filled has been molded; meanwhile the insulation molding machine is heated and maintained at 150° C. to 160° C., and the pressure is maintained at 3 MPa to 5 MPa, under which circumstances the crosslinking is performed for 3 to 8 hours to allow the cable factory insulation layer and the filling insulation to cross link and melt into one body.

In step b, the particularly molded body of the cable stress control module insulation is mounted and fixed in the center of molding cavity of the filling semiconducting layer molding machine before the molten cross-linked semiconducting material is filled, and the molding machine is heated to 120° C. and maintained at this temperature; after the small extruder and the control instrument are connected, and the extruder is heated to a temperature between 105° C. and 120° C., the extruder is started to extrude the molten cross-linked semiconducting material into the semiconducting layer molding machine; the extruding is stopped when the pressure within the molding machine reaches 2 MPa to 5 MPa, and at this time the cross-linked semiconducting material has been molded in the molding machine; meanwhile the semiconducting layer molding machine is heated and maintained at 150° C. to 160° C., and the pressure is maintained at 3 MPa to 5 MPa, under which circumstances the crosslinking is performed for 3 to 8 hours to allow the cable factory insulation layer, the filling insulation and the filling semiconducting layer to cross link and melt into one body.

The whole filling insulation takes the general shape of the pit of a date which is high in the middle part and small at two ends, and the highest middle filling insulation is inwardly configured as a concave curve, such that the filling semiconducting layer is composited on the concave curve and is connected with the stripped and cut port of the outer semiconducting layer of the cable.

The present invention has the beneficial effects that the manufacturing process is convenient to operate, and the manufactured stress control module is integrated with the cable body; the electrical property of electric field stress distribution is stable, the problem that an active interface is generated between the cable and the stress control module as they are made of different materials is solved, and the problem of breakdown of cable insulation as a result of local electric field distortion of the insulating layer caused by space charge accumulation at an insulation border is avoided. The manufacturing process of the present invention breaks through the technical bottleneck in the industry worldwide that an ultra-high voltage DC cable is free of termination connection, and meets the requirements for submarine cable as well as AC and DC high-voltage/ultra-high-voltage cable termination on-site manufacture and breakdown rescue.

BRIEF DESCRIPTION OF DRAWINGS

A further description will be made below in connection with the accompanying drawings and preferred embodiments of the present invention.

DETAILED DESCRIPTION

The manufacturing process of the present invention is used for overcoming electric field distortion at the stripping and cutting position of the semiconducting layer of the cable body termination, thereby preventing breakdown at this position. This position is mainly subjected to the following processes: melting and crosslinking of the factory insulation layer and the filling insulation; melting and crosslinking of the factory semiconducting layer and the filling semiconducting layer; and melting and crosslinking of the filling insulation and the filling semiconducting layer. After the above-mentioned operations, the injection molding manufacture of the stress control module may be accomplished. Then, the manufacture of a cable terminal may be started subsequently.

Figure 1:
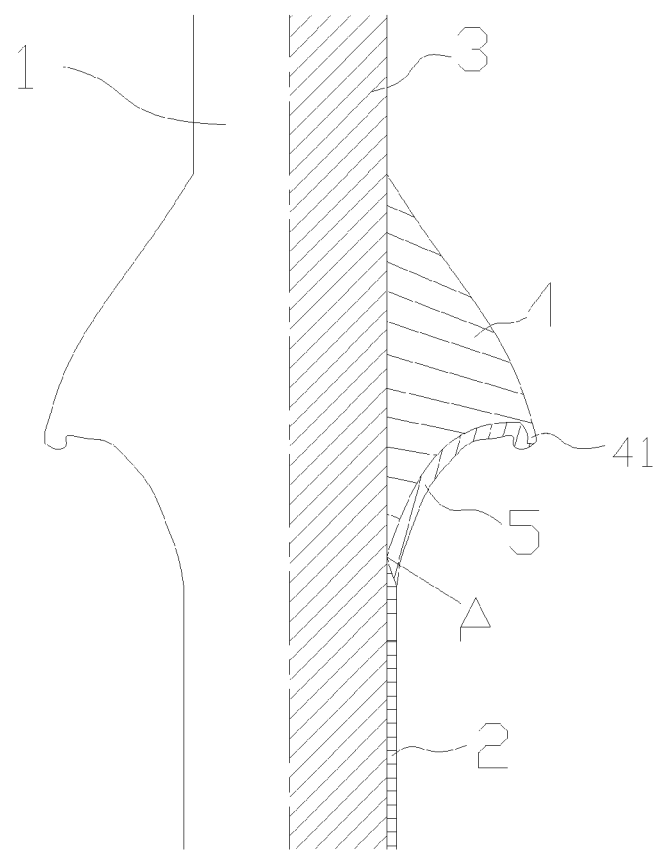
FIG. 1 is a structural schematic diagram of a stress control module manufactured according to the present invention.

In particular, as shown in FIG. 1, the manufacturing process comprises the following steps: according to the requirements of the manufacturing process, stripping and cutting an outer protection layer and a metal protection layer at the cable termination, stripping an outer semiconducting layer (i.e., a factory outer semiconducting layer 2) of cable 1, and grinding and smoothing the cable insulation (i.e., the factory insulation surface 3); mounting a molding machine at one end of (i.e. a port) of the factory outer semiconducting layer 2 of the cable, fixing the cable in the center of molding cavity of the insulation molding machine, and connecting a small extruder and a control instrument; extruding a molten cross-linked polyethylene insulation (i.e., a filling insulation 4) having the same material as the cable insulation into a cavity of a molding machine when the insulation molding machine is started and preheated to a temperature at which the cross-linked polyethylene melts, and raising the temperature and performing crosslinking through heating to allow the factory insulation 3 and the filling insulation 4 to melt, graft and combine into an integrated insulation after the molding cavity of the molding machine is filled with the filling insulation 4; and removing the insulation molding machine after it is cooled to obtain a particularly molded body of a cable termination stress control module insulation. Wherein the cable body is first put into the insulation molding machine for fixation and sealing before the molten cross-linked polyethylene cable insulation material is filled, and the molding machine is heated to 120° C. and maintained at this temperature; then the extruder is started to extrude the molten cross-linked polyethylene insulation in the extruder into the molding machine after the extruder is heated to a temperature between 105° C. and 120° C., the extruding is stopped when the pressure within the molding machine reaches 2 MPa to 5 MPa, and at this time the cross-linked polyethylene insulation filled has been molded; meanwhile the insulation molding machine is heated and maintained at 150° C. to 160° C., and the pressure is maintained at 3 MPa to 5 MPa, under which circumstances the crosslinking is performed for 3 to 8 hours to allow the cable factory insulation layer 3 and the filling insulation to cross link and melt into one body.

The manufacturing process further comprises the following steps: mounting a filling semiconducting layer molding machine at port A of the factory outer semiconducting layer of the cable; mounting and fixing the particularly molded body of the stress control module insulation in the center of molding cavity of the filling semiconducting layer molding machine, connecting the small extruder and the control instrument, and preheating the extruder; when the molding machine is started up and preheated to a temperature at which a cross-linked semiconducting material melts, starting the extruder to extrude the molten semiconducting material having the same material as the outer semiconducting layer of the cable into a cavity of the filling semiconducting layer molding machine to form a filling semiconducting layer 5, stopping the extruder after the cavity of the semiconducting layer molding machine is filled with the molten filling semiconducting material, and then raising the temperature and performing crosslinking through heating to allow the factory outer semiconducting layer 2, the factory insulation 3, the filling insulation 4 and the filling semiconducting layer 5 to melt, graft and combine with each other; and removing the insulation molding machine after it is cooled to obtain a particularly molded body of conduction and insulation of a cable termination stress control module. Wherein the particularly molded body of the cable stress control module insulation is mounted and fixed in the center of molding cavity of the filling semiconducting layer molding machine before the molten cross-linked semiconducting material is filled, and the molding machine is heated to 120° C. and maintained at this temperature; after the small extruder and the control instrument are connected, and the extruder is heated to a temperature between 105° C. and 120° C., the extruder is started to extrude the molten cross-linked semiconducting material into the semiconducting layer molding machine; the extruding is stopped when the pressure within the molding machine reaches 2 MPa to 5 MPa, and at this time the cross-linked semiconducting material has been molded in the molding machine; meanwhile the semiconducting layer molding machine is heated and maintained at 150° C. to 160° C., and the pressure is maintained at 3 MPa to 5 MPa, under which circumstances the crosslinking is performed for 3 to 8 hours to allow the cable factory insulation layer, the filling insulation and the filling semiconducting layer to cross link and melt into one body.

In order to achieve a better stress control, the whole filling insulation takes the general shape of the pit of a date which is thick in the middle part and thin at two ends, and the highest filling insulation at middle is inwardly configured as a concave curve 41, such that the filling semiconducting layer is composited on the concave curve and is connected with the stripped and cut port A of the outer semiconducting layer of the cable.

Figure 2:
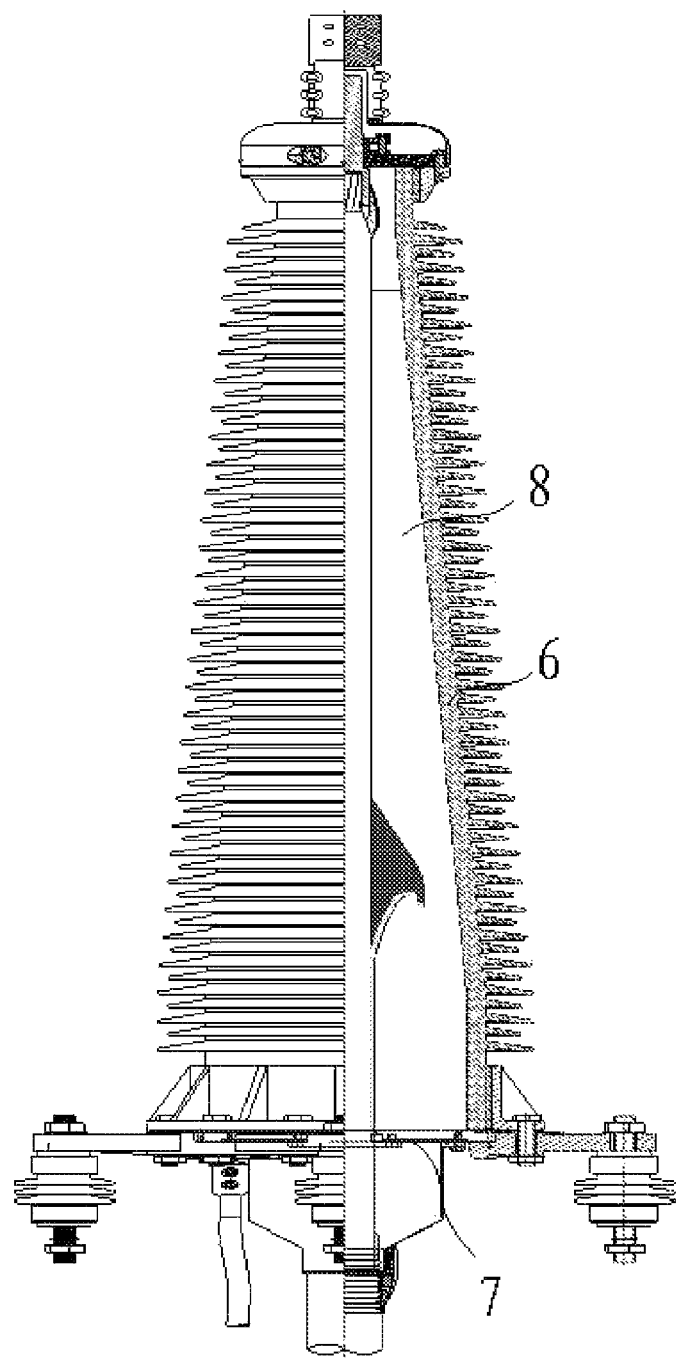
FIG. 2 is a structural schematic diagram of one embodiment of a cable terminal.

After accomplishing the injection molding of the stress control module, the manufacture of the cable terminal may be started subsequently. As shown in FIG. 2, the stress control module is placed into a termination porcelain shell or a composite shell 6 whose bottom is nested with a flange 7; an insulating oil 8, which is generally liquid insulating medium such as toad oil or polyisobutylene and the like, is filled into internal voids of the termination porcelain shell or the composite shell 6 until fully filled; and finally the porcelain shell or the composite shell 6 is sealed at the top to obtain the cable terminal.

What is claimed is:

1. A manufacturing process for termination injection molding stress control module for crosslinkable polyethylene insulated cable body, characterized in that it comprises the following steps:

stripping an outer protection layer and a metal protection layer of the cable body at a termination location, stripping an outer semiconducting layer of the cable, and smoothing the cable insulation;

mounting a insulation molding machine at a port of the outer semiconducting layer of the cable, fixing the cable in the center of molding cavity of the insulation molding machine, and connecting an extruder;

extruding a molten crosslinkable polyethylene insulation having the same material as the cable insulation into a cavity of the insulation molding machine, and raising the temperature and performing crosslinking through heating to allow the cable insulation and the crosslinkable polyethylene insulation to melt, graft and combine into an integrated insulation after the molding cavity of the insulation molding machine is filled with the crosslinkable polyethylene insulation; and removing the insulation molding machine to obtain a particularly molded body of a cable termination stress control module insulation; and mounting a filling semiconducting layer molding machine at a port of the outer semiconducting layer of the cable;

fixing the particularly molded body of the stress control module insulation in the center of molding cavity of the filling semiconducting layer molding machine, connecting the extruder, starting the extruder to extrude the molten semiconducting material having the same material as the outer semiconducting layer of the cable into a cavity of the filling semiconducting layer molding machine to form a filling semiconducting layer, stopping the extruder after the cavity of the filling semiconducting layer molding machine is filled with the molten filling semiconducting material, and then raising the temperature and performing crosslinking through heating to allow the outer semiconducting layer, the cable insulation, the crosslinkable polyethylene insulation and the filling semiconducting layer to melt, graft and combine with each other; and removing the filling semiconducting layer molding machine after it is cooled to obtain a particularly molded body of conduction and insulation of a cable termination stress control module.

2. The manufacturing process for termination injection molding stress control module for crosslinkable polyethylene insulated cable body according to claim 1, characterized in that the cable body is first put into the insulation molding machine for fixation and sealing before the molten crosslinkable polyethylene insulation is filled, and the insulation molding machine is heated to 120° C. and maintained at this temperature; then the extruder extrudes the molten crosslinkable polyethylene insulation into the insulation molding machine after the extruder is heated to a temperature between 105° C. and 120° C., the extruding is stopped when the pressure within the insulation molding machine reaches 2 MPa to 5 MPa, and the crosslinkable polyethylene insulation filled has been molded simultaneously; the insulation molding machine is heated and maintained at 150° C. to 160° C., and the pressure is maintained at 3 MPa to 5 MPa, under which circumstances the crosslinking is performed for 3 to 8 hours to allow the cable insulation layer and the crosslinkable polyethylene insulation to cross link and melt into one body.

3. The manufacturing process for termination injection molding stress control module for crosslinkable polyethylene insulated cable body according to claim 1, characterized in that the particularly molded body of the cable stress control module insulation is mounted in the center of the molding cavity of the filling semiconducting layer molding machine before the molten crosslinkable semiconducting material is filled, and the filling semiconducting layer molding machine is heated to 120° C. and maintained at this temperature; after the extruder are connected, and the extruder is heated to a temperature between 105° C. and 120° C., the extruder extrudes the molten crosslinkable semiconducting material into the filling semiconducting layer molding machine; the extruding is stopped when the pressure within the filling semiconducting layer molding machine reaches 2 MPa to 5 MPa, and at this time the crosslinkable semiconducting material has been molded in the filling semiconducting layer molding machine; meanwhile the filling semiconducting layer molding machine is heated and maintained at 150° C. to 160° C., and the pressure is maintained at 3 MPa to 5 MPa, under which circumstances the crosslinking is performed for 3 to 8 hours to allow the cable insulation layer, the crosslinkable polyethylene insulation and the filling semiconducting layer to cross link and melt into one body.

4. The manufacturing process for termination injection molding stress control module for crosslinkable polyethylene insulated cable body according to claim 1, characterized in that the whole crosslinkable polyethylene insulation takes a shape which is high in the middle part and small at two ends, and the highest middle crosslinkable polyethylene insulation is inwardly configured as a concave curve, such that the filling semiconducting layer is composited on the concave curve and is connected with the stripped and cut port of the outer semiconducting layer of the cable.

\* \* \* \* \*